United States Patent [19]

Stofko

[11] Patent Number: 4,944,823

[45] Date of Patent: Jul. 31, 1990

[54] COMPOSITION FOR BONDING SOLID LIGNOCELLULOSIC MATERIALS

[75] Inventor: John Stofko, Beaverton, Oreg.

[73] Assignee: Carbocol, Inc., Beaverton, Oreg.

[21] Appl. No.: 780,295

[22] Filed: Sep. 26, 1985

[51] Int. Cl.$^5$ .............................................. B32B 31/00
[52] U.S. Cl. ................................... 156/283; 106/162;
106/210; 106/287.25; 156/62.2; 156/312;
156/331.7; 156/336; 428/537.1; 528/85; 536/48
[58] Field of Search ............. 156/283, 336, 312, 331.7,
156/62.2; 106/162, 210, 287.25; 536/48;
528/85; 428/537.1

[56] References Cited

PUBLICATIONS

"Cornstarch Adhesive as Bonding Agent for Particleboard", an Abstract from *Forest Products*, by Lourdes D. Turreda, *NSTA Technology Journal*, Apr.–Jun., 1985.
"Improvement of Water Based Adhesives by Isocyanates (2) Improvement of Starch based Adhesive", Masato GAMO, Hiroshi Yamamoto, Faculty of Agriculture, Tokyo University of Agriculture and Technology, Abstract, pp. 41–46, vol. 15, No. 2, 1979.

*Primary Examiner*—John J. Gallagher
*Attorney, Agent, or Firm*—Browdy and Neimark

[57] ABSTRACT

Wood surfaces are bonded together by heating and pressing using a preferably dry binder formulation constituting a thorough mixture of an isocyanate and a sugar or starch, the binder formulation also preferably containing a stabilizer and optionally a catalyst and a release agent. The binder formulation may be used with good results in an amount equal to the amount of straight isocyanate resin which would normally be used, i.e. the sugar or starch replaces a quantity of the isocyanate which would normally have been used, thereby reducing the total quantity of isocyanate, thus reducing cost without any disadvantage.

15 Claims, 1 Drawing Sheet

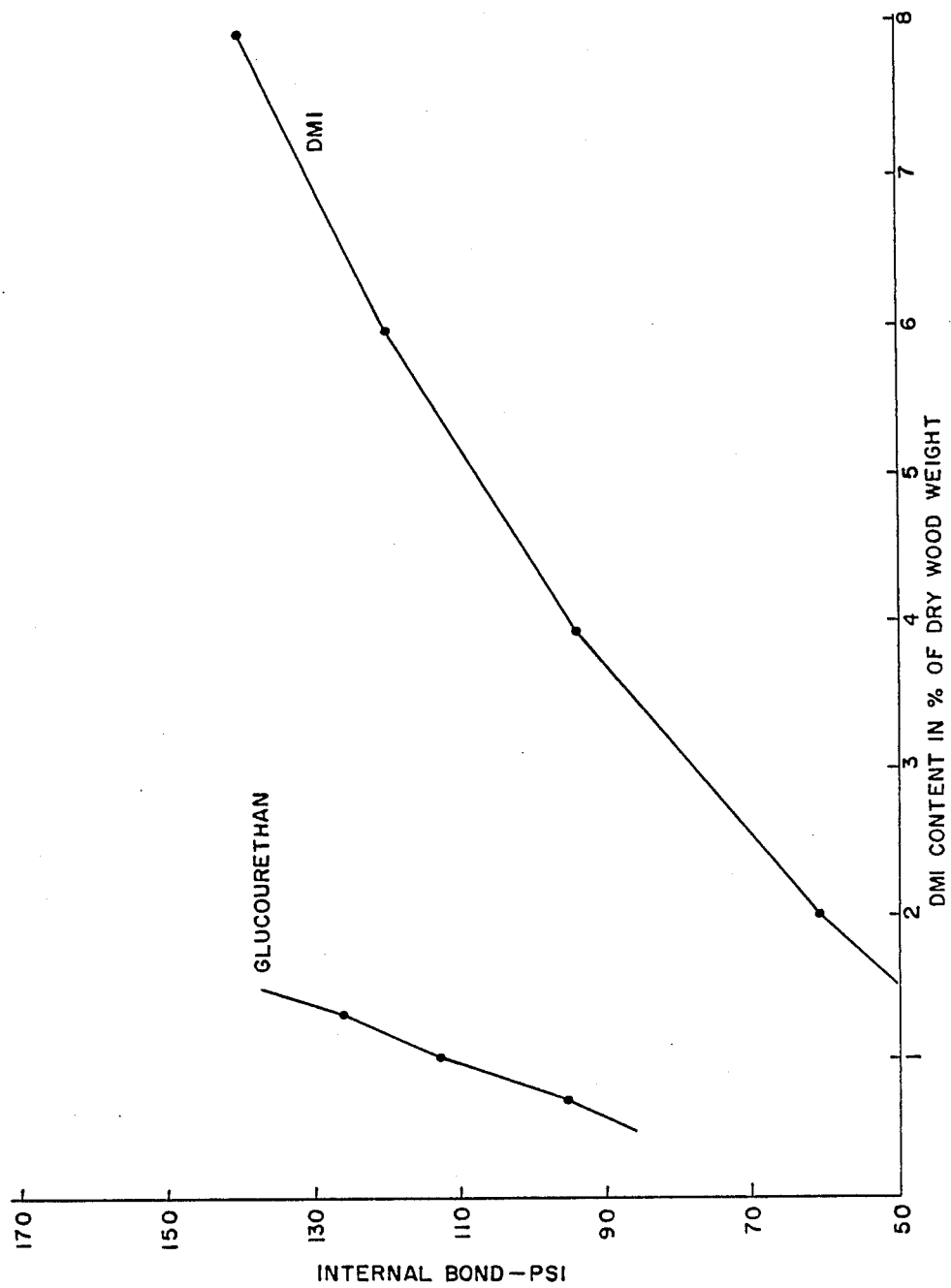

COMPOSITION FOR BONDING SOLID LIGNOCELLULOSIC MATERIALS

FIELD OF INVENTION

The present invention relates to the bonding of wood surfaces, in the manufacture of composite wood products such as plywood, particle board, fiberboard and the like. More particularly, it concerns a binder composition for such a purpose.

BACKGROUND OF THE INVENTION

At the present time, the major bonding systems being used in the manufacture of composite products of wood still utilize resin condensates of formaldehyde with urea or melamine or with phenol or other phenolics. As a result of general economic conditions and especially the cost of petrochemicals, there is a continuous incentive to reduce the cost involved in the manufacture of bonded wood products. In addition, urea-formaldehyde resin releases formaldehyde which is carcinogenic and an eye and mucosa irritant, thus creating a possible health problem, and certainly giving the wood product an undesirable odor Adhesives based on carbohydrates, such as starches or sugars, which are converted to binders by various means, have also been suggested and have been adopted to some extent. Carbohydrate binders have an important advantage in lower production costs and zero formaldehyde emission. On the other hand, synthetic resin binders based on the condensation of formaldehyde with urea, melamine or phenol have a significant advantage over carbohydrate binders in requiring lower curing temperatures and shorter curing times, which are important production cost affecting factors.

An improved system has recently been developed as set forth in Stofko co-pending application Ser. No. 761,793, and its parent Ser. No. 580,157 filed Feb. 14, 1984, in which mixtures of sugars and formaldehyde resins are utilized, which mixtures have a number of advantages, including cure time and cure temperatures substantially equivalent to those of formaldehyde condensation resins, yet which admixtures are less expensive because of the utilization of substantial quantities of sugar and which release no formaldehyde into the environment.

Isocyanates, especially 4,4'-diphenylmethane diisocyanate, hereinafter DMI, have been suggested as binders for wood. However, wide industrial use of DMI as a wood binder has never materialized because DMI is more expensive than the conventional formaldehyde-based adhesives, such as urea-formaldehyde. At current prices, DMI is five times more expensive than urea-formaldehyde resins, and its use at even the minimum suitable quantity of 2% resin content still makes such use about 56% more expensive than the use of urea-formaldehyde resin at 6%, resin content again based on the weight of the wood. This makes isocyanates too expensive for normal commercial production.

It is technically very difficult if not impossible to uniformly distribute 2%, based on the weight of the wood particles, of liquid isocyanate on such a large surface. For this reason, at the present time the state of the art demands at least 3% of DMI at a very minimum for producing interior particle board, and about 4-5% of DMI for producing exterior particle board; 2.5% DMI is necessary for producing waferboards using large wafers as particles. At 3% DMI content, isocyanates are much more expensive than urea-formaldehyde or phenolformaldehyde resins and therefore are uneconomical. It has been attempted to extend DMI by the use of an inactive carrier, such as bark powder, but this has not been successful.

SUMMARY OF THE INVENTION

It is, accordingly, an object of the invention to overcome defects in the prior art, such as indicated above.

It is another object to provide for the improved bonding of wood products such as plywood, particle board, fiberboard and the like, in an effective and inexpensive way.

It is a further object to provide an improved binder for the manufacture of composite wood products such as plywood, particle board, fiberboard and the like, which binder is based on the reactive mixture of isocyanate and carbohydrate material, and yet which is both effective and inexpensive, and which eliminates health hazards associated with the use of formaldehyde.

These and other objects and the nature and advantages of the instant invention will be more apparent from the following detailed description of the invention which follows this summary.

Briefly it has now been found that if carbohydrates or other active carriers are intimately contacted with isocyanates for example by adsorption, or intermixing, and allowed to react with each other under suitable conditions and the resultant isocyanate activated carbohydrates are then dispersed on the wood surfaces to be bonded, followed by pressing the particulate wood under heat and pressure, such as in a hot press, excellent bonding is obtained while using only a very small amount of expensive isocyanate material and at conditions of curing temperature and time which are currently used in industry with formaldehyde base resins.

BRIEF DESCRIPTION OF DRAWING

FIG. 1 is a comparative graph.

DETAILED DESCRIPTION OF EMBODIMENTS

The instant invention is based on the discovery that isocyanates react with carbohydrates, optionally in the presence of other active materials, to produce reactive or activated carbohydrates capable of bonding wood at moderate temperatures and times. It is also possible to use such an other active material to the exclusion of the carbohydrate, and although considerably improved results are achieved compared to the use of an inactive carrier such as bark powder or pumice, the results are not as good as when carbohydrate is present.

By "other active material" is meant a fine particulate or liquid material which not only serves as a carrier for the isocyanate, but also serves to interact therewith in such a way as to positively contribute to the bonding of one wood surface to another. While the proper selection of such an "active" material is important to the instant invention, nevertheless suitable active materials may be selected from a wide range of materials including weak acids such as boric acid; acidic salts such as sodium sulfate or sodium chloride; carbonates; and mixtures of these materials. The precise function of such "active" substances and their mechanism of action are not understood. Such other "active" materials provide, in addition, other functions as catalysts, modifying, stabilizing and/or release agents, and all may be used in combination and together with isocyanate.

By far the preferred active materials for use with the isocyanates are sugars and starches, which are preferably present whether or not the "other active" materials are present. While the precise mechanism of function of such carbohydrates is not fully understood, it is believed that they react with the isocyanates to produce reactive carbohydrates in the nature of glucourethanes which are good low temperature wood binders.

A wide variety of carbohydrates can be used for making activated carbohydrate adhesives according to the present invention. The two main sources are sugars and starches. As sugars, there may be mentioned sucrose, glucose, fructose, raw sugar, powdered sugars derived from wood, and mixtures thereof. As starches, there may be used any kind of starch, such as wheat starch, corn starch, potato starch or starch containing materials such as wheat, corn or potato flour, or mixtures thereof. Other possibilities are mentioned in Stofko U.S. Pat. No. 4,183,997. It will be understood that mixtures of starches and sugars can also be used.

It must be noted, however, that the liquid isocyanate and the dry carbohydrate active materials start to react chemically, even at room temperature, immediately after they are brought into contact with one another. As a result of this reaction, the sugars become insoluble in water and the isocyanate becomes chemically attached to the sugars.

As sugars and starches contain five hydroxyl groups on each monomeric unit, i.e. each glucose unit, it would appear that the isocyanate reacts with such hydroxyl groups to partially or completely convert them to urethane groups, whereby the glucose becomes converted to a glucourethane or the like, which is not soluble in water. Such a glucourethane appears similar to the reaction product of phenol and an isocyanate, a so-called blocked isocyanate, which is reversible at 300° F. and is known to be relatively stable with respect to water. Regardless, the resultant glucourethanes are good binders of wood, although the mechanism of their coupling to wood is not understood at the present time and may be quite complex.

With regard to the other active materials which may be used, either in place of or preferably in combination with the carbohydrate, these materials may provide a catalytic, modifying, stabilizing or release function. As catalysts, there may be mentioned catalytic acids, acidic salts, such as salts of hydrochloric acid, sulfuric acid, phosphoric acid, boric and other acids. Again, additional materials may be found in Stofko U.S. Pat. No. 4,183,997. As stabilizing agents which reduce swelling and water absorption, there may be mentioned sodium chloride, sodium sulfate, paraffin, fatty acids or their salts such as zinc stearate and other similar materials. At the same time, paraffin and fatty acids and their salts may serve as release agents. Use of other active materials may shorten pressing and curing time.

As liquid isocyanates, those having the polymethylene polyphenol isocyanate structure, such as DMI, are particularly suitable. The requirements of the isocyanate are that it be capable of carrying out its desired adhesive function and that it be liquid at ambient temperatures and at its proposed temperature of use. In addition to DMI, there may be briefly mentioned cyclohexyl isocyanate; octadecyl isocyanate; hexamethylene diisocyanate; phenyl isocyanate; p-chloroisophenyl cyanate; 2,4-toluene diisocyanate and the like; if the temperature of curing is maintained below 110° C., other choices are available including n-butyl isocyanate; 3,4-dichlorophenyl isocyanate and even m-phenylene diisocyanate.

In general, compositions of the instant invention are used merely by mixing simultaneously or gradually the desired proportions of liquid diisocyanate with the selected active materials and applying the resultant product to wood which is then pressed to form composite product. However, thorough mixing of such materials is needed.

The relative quantities of the isocyanate and the active particles are subject to wide variation. Liquid formulations can be made from 40–90% of isocyanate and 60–10% of solid carbohydrate particles, although if there is 50%–60% carbohydrate, the mixture behaves like a homogeneous viscous resinous liquid. Homogeneous wet powder mixtures or pasty mixtures contain about 20–40% liquid isocyanate and about 80–60% of active powder. Drier powdery formulations comprise from 2–20% of liquid isocyanate and 80–98% of active powder. Compared to the liquid formulations, the solid formulations have the economic advantage of incorporating smaller amounts of the more expensive isocyanate component.

Powdery binders according to the invention are preferred to liquid binders, as they give better results. Isocyanates react with water to produce urea and carbon dioxide, neither of which contribute to the desired bonding. Even if water is not present, liquid tends to soak into the wood and any solvent needs to be driven off, thereby requiring time and heat.

Even very small amounts of the liquid isocyanate, such as 5–15% thereof, can be relatively uniformly distributed in carbohydrate powders by vigorous mixing. This is possible because isocyanates like DMI are non-tacky and react with the carbohydrates, and this reaction controls the amount of isocyanate which can be attached to each carbohydrate particle. Initial clumps are rapidly disintegrated to a homogeneous powder. As DMI is a dark brown liquid and most carbohydrates are white powders, the uniformity of distribution is well demonstrated by color change from white to brown.

The isocyanates readily react with water, and consequently the use of liquid compositions requires special care in view of substantially shorter storage life. If the isocyanate treated active particles are prevented from contact with water or water vapor, they retain reactivity to work for more than about 70 hours without any special treatment. Maximum bonding performance, in terms of produced internal bond in particle board, is achieved about 4–5 hours after intermixture of DMI and carbohydrate active powder. Performance gradually levels off and activity becomes stable for more than 70 hours. However, after about 200 hours, the reactivity of the mixed product is significantly reduced. Thus, unless special precautions are taken, the storage life of DMI treated carbohydrate particles is 3–5 days.

The quantity of isocyanate treated active particles or glucourethanes used in any particular case should be kept to a minimum, consistent with obtaining the bond strength and other properties desired upon pressing at no more than the normal pressures (about 5–50 kg/cm$^2$) and temperatures (about 100°–200° C.) and for no more than the conventional press times, e.g. 10–30 sec. per 1/16 inch of thickness.

The quantity of binder composition needed to accomplish this result to some extent depends on the nature of the bonded wood product being prepared. For example, when making particle board or fiberboard, as opposed to plywood, the wood pieces are small and have a very large total surface area.

According to one application of the present invention, the isocyanate treated active powder or glucourethane adhesive is intermixed with wood particles by mechanical agitation using the industry standard blending techniques and equipment, and particle board is pressed from the so-coated particles using the industry standard press temperatures and time cycle conditions, to thereby obtain a particle board having physical properties required by industry standards, and using such binder compositions which contain only 0.25-2% of isocyanates, such as DMI, based on the weight of the wood. Where the active powder comprises predominantly carbohydrate so that the binder is a glucourethane, then the carbohydrate content is about 2-12%, again based on the weight of the wood. The resin cost of such binder is comparable to the cost of currently used urea-formaldehyde resins.

If carbohydrates converted to glucourethane are admixed with wood particles in a quantity of 8% based on the weight of the wood, using simple mechanical agitation, and particle board is formed in the usual way by compression between two hot press plattens, a solid product is obtained which is not disintegrated by cold or boiling water. The internal bond achieved in such a product in relation to the amount of DMI content in the carbohydrate, expressed in percentage of the weight of the wood, is shown in FIG. 1. As a comparison, internal bond values achieved using pure DMI at 2 to 8% content expressed as percentage of wood weight is also included in FIG. 1 for comparison (Deppe, H.J.: Proceedings, Particle Board Symposium, Washington State University, 1977). The comparative graph of FIG. 1 clearly shows that a quantity of only 0.5% DMI, combined with carbohydrate in the form of a glucourethane in accordance with the present invention, gives an internal bond strength (about 85 psi) equal to about 3.5% of straight DMI; in other words, an equivalent result is achieved by the use of only 1/7 the amount of DMI. Similarly, using the glucourethane of the invention containing 1% of DMI based on the total wood weight yields an internal bond at 110 psi, equivalent to about 5½% of straight DMI. Using the glucourethane containing 1.5% DMI provided a result equivalent to 8% straight DMI.

As indicated above, the percentages of ingredients in the wood binder compositions according to the present invention can vary widely according to needs and conditions of a particular application. In general, however, quantities in the following ranges have been found suitable, bearing in mind that the other active materials may comprise one or more of the catalysts, stabilizing agents and release agents:

|   |   | (preferred) |   | (preferred) |
|---|---|---|---|---|
| I. Carbohydrate and/or other active material |   |   | 10-98% | (50-95%) |
| A. sugar or starch | 0-98% | (30-95%) |   |   |
| B. catalyst | 0-10% | (0-10%) |   |   |
| C. stabilizing agent | 0-90% | (20-45%) |   |   |
| D. Release agent | 0-10% | (0-10%) |   |   |
| II. Isocyanate |   |   | 2-90% | (5-50%) |

A preferred formulation for composite products such as particle board comprises a blend of sugar or starch powder or mixture thereof, together with isocyanate, with or without stabilizing agent, catalyst or release agent. The formulation for a particular product will depend upon wood species, requirements of physical properties of the resultant product, and pressing conditions. For example, a formulation for Doublas fir commercial furnish requirements for interior particle board pressed at a press platten temperature of 350° F. for 4.4 minutes press time, to give a high quality commercial product, is as follows:

|   |   | (Preferred Range) |
|---|---|---|
| sucrose or starch powder | 57% | (50-65%) |
| DMI | 8.75% | (5-15%) |
| sodium sulfate (stabilizer) | 25% | (20-30%) |
| ammonium sulfate (catalyst) | 5% | (1.5-5%) |
| montan wax (release agent) | 4.25% | (3-10%) |

This binder formulation may be used in an amount of 3-10%, expressed as a percentage of the total wood weight, or about 0.25-2.0% of DMI based on the wood weight. Preferably, the quantity of binder formulation based on the weight of the wood is about 4-7%, depending on the configuration of the particulate wood and the requirements of the products. Also, if a small amount of isocyanate is used in the binder formulation (e.g. about 2-7% based on the total binder formulation, providing a relatively dry powder), then relatively greater proportions of binder formulation will be used (e.g. 8-10% binder formulation, or 0.2-0.7% isocyanate based on the wood weight). On the other hand, when relatively small quantities of binder formulation are used (e.g. 3%), then the quantity of isocyanate in the powdery binder should be somewhat greater (e.g. 10-15%) to provide sufficient bonding; this provides a minimum percentage of isocyanate based on the quantity of wood of about 0.3-0.45%. In general, using a preferred powdery binder formulation, the maximum amount of isocyanate present will be about 15% based on the binder, or 1.5% based on the wood when 10% binder is used.

Liquid wood binder formulations according to the present invention can be made by blending isocyanates with carbohydrates using at least 50% by weight of isocyanate, with the remainder starch or sugar. A viscous resinous-like liquid containing no water is obtained which can satisfactorily be used for making consolidated wood products, e.g. laminates, of wood particles or plys containing a relatively high moisture content, e.g. 8-12% While catalysts are desirable in the liquid formulations, there is no need for stabilizing or release agents. It is also possible to make the liquid binder formulations to the present invention using less than 50% of isocyanate, by the use of small quantities of inert, polar, non-aqueous (solvent) such as methylene chloride, or liquid sugars such as invert syrups, high maltose corn syrup or high fructose syrup, although care must be exercised in minimizing the water content of these liquid sugars because of the undesirable reaction between the isocyanate and the water prior to the wood bonding operation.

Liquid binder formulations according to the present invention can also be made by first mixing a relatively large quantity of dry starch or sugar with a relatively small quantity of isocyanate, letting the mixture react to the point where free isocyanate is no longer present, and then adding (water) to form a viscous mass. Thus, such a viscous mass can be obtained by first blending isocyanate with starch or sugar in the ratio of 10–50% by weight isocyanate and 50–90% of powdered carbohydrate, then letting the mixture react for 5–60 minutes, and finally adding 30–70%, based on the weight of the mixture, of water to obtain a viscous mass suitable for roller spreading on veneers in plywood manufacture. Viscosity can be controlled by adjusting the ratio of components in the mixture. After adding water, a reaction between the glucourethane and water takes place which results in a viscosity increase of the blend, and therefore this type of liquid binder has a relatively short shelf life.

Binder formulations according to the present invention are made by blending together the various components in the proper sequence as noted above. When producing the preferred powdery binders, such blending preferably involves vigorous agitation for several minutes, such as in a suitable mill, in order to insure thorough blending of the isocyanate with the other components. It is preferable to blend together first the isocyanate with the stabilizing agent, catalyst and release agent (if one or more of these latter components are used) and then to add the carbohydrate. Of course, the blending should be carried out for a time sufficient to produce a homogeneous blend, and under vigorous blending conditions this will usually occur after several minutes of vigorous agitation.

The powdered binder formulations are applied to wood particles in the manufacture of particle board, wafer board, fiberboard, etc., by intermixing a stream of wood particles with a stream of the powdered binder formulation at the desired ratio and using mechanical agitation which is in common usage in the manufacture of composite products such as particle board. When using powdered binders to make particle board or the like, the wood may have a wide range of moisture content, i.e. from about 1% to about 10% by weight based on the total weight of the wood particles. However, it is advantageous if the moisture content of the wood particles is relatively low, i.e on the order of about 1–6%, and after initial pressing and prior to final compacting in a hot press, the pre-formed particle board is sprayed with water to increase its moisture content to 10–11%.

As soon as the powdered binder according to the invention comes into contact with wood, it starts reacting with the hydroxyl groups of the wood carbohydrate and also with water contained in the wood and in the air. Thus the final compacting of the particle board under heat and pressure must be completed in less than about 4 hours.

The present system has several technically and economically important features which constitute significant and novel improvements in wood bonding technology. Thus, the binder and resultant product are free of formaldehyde, and the product is produced at a cost competitive to the cost of making composite wood products using urea-formaldehyde resin which has the serious problem of formaldehyde emission. The binder formulation can be produced from easily available and simple common chemicals and can be applied to wood at higher moisture content which saves energy by reducing the degree of drying normally required prior to pressing.

The following examples, in which amounts of all materials are expressed in parts by weight, will illustrate the manner in which the invention can be practiced. It is to be understood that the specific features set forth in these examples are not to be considered limiting of the invention.

EXAMPLE 1

Batches of Douglas fir particles of 4 5% moisture content were mixed by hand in a container with 8%, based on the weight of the wood, of various powdered adhesives according to the invention, as set forth in Table I below. After 3 minutes of mechanical agitation, the powdered adhesive appeared to be uniformly dispersed on the surfaces of the wood particles. Mats of the coated wood particles were then deposited in a rectangular box and were then pre-pressed at 300 psi for 30 seconds. The pre-pressed mats were then sprayed with water on both sides to increase the moisture content of the particles to about 9%. The mats were then pressed to ⅜" thick particle board between two hot press plattens at 350° F., for 4 5 minutes. After cooling to room temperature, samples were cut from each of the so-formed particle boards, and the test specimens were tested for internal bond strength, thickness swelling and water absorption. The results are shown in Table I below. As can be seen from this Table, the results were very good using only a very small percentage of DMI based on the weight of the wood.

TABLE I

| Binder formulation % of wood weight | | | | | Density LB/FT$^3$ | Internal Bond psi | 24 hrs soak in water | |
|---|---|---|---|---|---|---|---|---|
| C | DMI | S | CAT | R | | | % swell | % absorption |
| 7 | 1.0 | 0 | 0 | 0.5 | 45.7 | 120.3 | 19.2 | 30.6 |
| 7 | 0.7 | 0 | 0 | 0.5 | 44.7 | 105 | 52.9 | 129 |
| 7 | 0.5 | 0 | 0.2 | 0 | 46.14 | 90.5 | 38.9 | 73.4 |
| 3.5 | 1.0 | 3.5 | 0 | 0 | 46.2 | 99.6 | 14.9 | 40.5 |
| 0 | 1.0 | 7 | 0 | 0 | 45.5 | 84.1 | 11.7 | 29.3 |

C = sucrose; S = sodium sulfate; CAT = ammonium sulfate; R = sebacic acid

EXAMPLE 2

Following the same procedure as in Example 1, two sets of particle boards were pressed at 350° F press platten temperature and 3.5 minutes press time at conditions specified in Table II using starch or wheat flour as the carbohydrate.

TABLE II

| Binder formulation % of wood weight | | | | Density LB/FT$^3$ | Internal Bond psi | 24 hrs soak in water | |
|---|---|---|---|---|---|---|---|
| ST or WF | DMI | S | CAT | | | % swell | % absorption |
| 6.07 ST | 1.07 | 3.03 | 0.536 | 51.7 | 156 | 15.9 | 32.3 |
| 5.06 ST | 0.846 | 2.53 | 0.446 | 50 | 115 | 17.3 | 35.9 |
| 4.05 ST | 0.714 | 2.02 | 0.357 | 48.6 | 123 | 17.6 | 41.5 |
| 3.24 ST | 0.57 | 1.616 | 0.57 | 49.3 | 121 | 22.1 | 48.1 |
| 8 WF | 1.41 | — | — | 48 | 142 | 21.7 | 63.5 |
| 6.16 WF | 1.09 | — | — | 47 | 118 | 22.3 | 68.5 |
| 4.31 WF | 0.76 | — | — | 47.5 | 93 | 25.8 | 82.2 |

TABLE II-continued

| Binder formulation % of wood weight | | | | Density LB/FT³ | Internal Bond psi | 24 hrs soak in water | |
|---|---|---|---|---|---|---|---|
| ST or WF | DMI | S | CAT | | | % swell | % absorption |
| 3.08 WF | 0.54 | — | — | 45.9 | 73 | 32.7 | 104.1 |

ST = starch; WF = wheat flour; S = sodium sulfate; CAT = ammonium sulfate;

EXAMPLE 3

Liquid binder was made by blending together 50% DMI, 45% industrial wheat flour and 5% ammonium sulfate. This binder was then spread by roller spreader on ⅛" Douglas fir veneers of 8% moisture content in the amount of 25 grams per square foot, double glue line. The so-coated veneers were then pressed to make 3-ply plywood, the pressing being carried out at 180 psi and 300° F. press platten temperature for 3.5 minutes. Standard shear tests were performed after vacuum-pressure exposure of specimens. Average wood failure obtained was 89%, indicating excellent bond.* *Wood failure below 50% provides an unacceptable product.

EXAMPLE 4

Liquid binder was made by blending together 80% of industrial wheat flour and 20% of DMI for 5 minutes; after 10 minutes of reaction time, 100 grams of the blend were mixed with 150 grams of water, followed by mixing for 5 minutes. The binder was then roller spread on ⅛" thick Douglas fir veneers in the amount of 28 grams per square foot of double glue line. Again a 3-ply plywood was made at 180 psi pressure and 300° F. press platten temperature for 3.5 minutes press time. Standard shear tests were performed after vacuum-pressure treatment of the specimens. The average wood failure was 90%*. *Wood failure below 50% provides an unacceptable product.

It is to be understood that the scope of the invention is not limited to the embodiments herein disclosed. Modifications may be made without departing from the invention by persons skilled in the art.

What is claimed is:

1. A method of bonding wood surfaces together and thereby producing a consolidated wood product, which comprises
    contacting said wood surfaces with an amount of bonding material of 1-15 grams per square foot area or 1-12% by weight based on the weight of wood, said bonding material consisting essentially of a homogeneous mixture, initially reacted in the substantial absence of water, of 50-95% by weight of starch or sugar or other active material, 5-50% of liquid isocyanate, 0-10% catalyst, 0-50% stabilizing agent and 0-10% release agent, or a glucourethane reaction product thereof, the total quantity of said liquid isocyanate being 0.25-2% by weight based on the weight of the wood;
    pressing the coated wood surfaces together at an elevated temperature and for a time sufficient to effect bonding to produce said bonded wood product.

2. A method according to claim 1 wherein said bonding material comprises a mixture of said liquid isocyanate and said carbohydrate, a glucourethane reaction product of said liquid isocyanate and said starch or sugar, or a mixture thereof.

3. A method according to claim 1 wherein said bonding material contains said other active material, and wherein said other active material is selected from the group consisting of weak acids, acidic salts, carbonates and mixtures thereof.

4. A method according to claim 1 wherein said liquid isocyanate is 4,4'-diphenylmethane diisocyanate.

5. A method according to claim 1 wherein said bonding material is a liquid and comprises 40-90% of said isocyanate and 60-10% of said starch or sugar.

6. A method according to claim 1 wherein said bonding material is a liquid containing at least 50% starch or sugar based on the mixture of isocyanate and starch or sugar, and further comprises a small quantity of inert, polar, nonaqueous solvent, or water added after an initial reaction has been effected between said isocyanate and said starch or sugar.

7. A method according to claim 1 wherein said bonding material is in the form of a homogeneous wet powdery or pasty mixture containing about 20-40% liquid isocyanate and about 80-60% of active material, starch or sugar.

8. A method according to claim 1 wherein said bonding material comprises at least 3% by weight of said liquid isocyanate.

9. A method according to claim 5 wherein said bonding material comprises said starch or sugar present in an amount of about 4-8% based on the weight of the wood.

10. A method according to claim 5 wherein said bonding material comprises 50-65% by weight of sugar or starch powder, 5-15% of isocyanate, 20-45% sodium sulfate stabilizer, up to 5% catalyst and up to 10% release agent.

11. A method according to claim 5 wherein said bonding material is applied at the rate of about 3-10% based on the weight of the wood.

12. A method according to claim 5 wherein said pressing is carried out in two stages.

13. A method according to claim 12 wherein, after the first stage of pressing, the product is sprayed with water.

14. A method according to claim 1 wherein pressing is carried out for less than one minute per ⅛ inch of board thickness at about 100°-200° C.

15. A method of bonding wood surfaces together and thereby producing a consolidated wood product, comprising
    contacting said wood surfaces with a homogeneous dry powdery bonding material in an amount of 1-15 grams per square foot area or 1-12% by weight based on the weight of the wood, said dry powdery bonding material consisting essentially of a homogeneous mixture of 80-98% by weight of starch or sugar or other active material, 2-20% of liquid isocyanate, 0-10% catalyst, 0-50% stabilizing agent and 0-10% release agent, or a glucourethane reaction product thereof, the total quantity of said liquid isocyanate being 0.25-2% by weight based on the weight of the wood; and
    pressing the coated wood surfaces together at an elevated temperature and for a time sufficient to effect bonding to produce said bonded wood product.

* * * * *